(12) United States Patent
Hakala

(10) Patent No.: US 12,489,536 B2
(45) Date of Patent: Dec. 2, 2025

(54) METHOD AND SYSTEM FOR DETERMINING AREA IN WHICH ATTENUATION OBJECT IS LOCATED

(71) Applicant: WiFiLocus Oy, Helsinki (FI)

(72) Inventor: Mika Hakala, Arlington, VA (US)

(73) Assignee: WiFiLocus Oy, Helsinki (FI)

( * ) Notice: Subject to any disclaimer, the term of this patent is extended or adjusted under 35 U.S.C. 154(b) by 479 days.

(21) Appl. No.: 18/158,803

(22) Filed: Jan. 24, 2023

(65) Prior Publication Data

US 2024/0250765 A1  Jul. 25, 2024

(51) Int. Cl.
  *H04B 17/373* (2015.01)
  *H04B 17/327* (2015.01)
  *H04B 17/391* (2015.01)

(52) U.S. Cl.
  CPC ......... *H04B 17/373* (2015.01); *H04B 17/327* (2015.01); *H04B 17/3912* (2015.01)

(58) Field of Classification Search
  CPC . H04B 17/373; H04B 17/327; H04B 17/3912
  See application file for complete search history.

(56) References Cited

U.S. PATENT DOCUMENTS

2014/0031062 A1*  1/2014  Gray .................... H04W 4/029
                                                           455/456.1

\* cited by examiner

*Primary Examiner* — Natasha W Cosme
(74) *Attorney, Agent, or Firm* — Ziegler IP Law Group, LLC

(57) ABSTRACT

Disclosed is a method for determining area (202) in which attenuation object (204) is located in space (206), wherein space is divided to finite elements (210, 210a-d). The method comprises providing first transmitter (208, 302) to transmit radio signal with first strength value; moving measurement device (212, 304) along first path (214) and a plurality of real signal strength values at interest-locations (216a-b) along the first path; calculating theoretical signal strength value, for each of the interest-locations of the first path, using radio signal propagation model assuming a free propagation between the first location and the interest-locations; setting attenuation value for each of the finite elements, along lines (218a-b) connecting the first location and the interest-locations; and using locations of the finite elements with the non-free space attenuation value to determine the area in which the attenuation object is located.

15 Claims, 3 Drawing Sheets

METHOD AND SYSTEM FOR DETERMINING AREA IN WHICH ATTENUATION OBJECT IS LOCATED

TECHNICAL FIELD

The present disclosure relates to method for determining an area in which an attenuation object is located in a space. The present disclosure also relates to system for determining an area in which an attenuation object is located in a space.

BACKGROUND

In recent times, wireless communication technology has enabled people to communicate with each other, irrespective of their location. The wireless communication technology has enabled world population to communicate through electronic mail (e-mail), discussion rooms (commonly known as chat rooms), audio and video transmission, work collaboratively irrespective of location, access digital information, and similar. Due to an increase in usage of wireless devices, wireless network is provided within a premises (such as, for example, a house, an office, and similar) to connect to the Internet. The wireless network uses radio waves to transmit information between the wireless devices and a router.

Despite progress in tools for determining the wireless network characteristics indoors, existing techniques and equipment for designing, surveying and simulating the wireless network have several limitations associated therewith. Firstly, the existing technique of surveying the premises to determine the strength and characteristics of the wireless network involves manually surveying the premises by walking through the premises to examine the state of the wireless network, subsequently changing a position of wireless devices within the premises, and re-walking through the premises to examine a changed state of the wireless network. In such a technique, there is no immediate proof of the changed state of the wireless network, until the premises are surveyed again. This increases manual labour, costs involved, and time. Secondly, a two-dimensional (2D) map can be generated based on a change in strength of the radio signals when the position of the wireless devices is changed within the premises. However, such 2D map is static, as the 2D map provides with the strength of the radio signals in a particular location at a particular time, when the surveying was performed. This can be highly misleading, and does not reflect any changes that may have taken place in the network. Thirdly, wireless simulator tools are used to simulate performance of the wireless network within the premises, without actually surveying the premises. However, attenuation values of structures within the premises should be precisely known to accurately simulate the performance of the wireless devices. Such attenuation values are hard to procure, either before construction or after construction of the premises, and hence often it is impossible to accurately simulate the performance of the wireless devices. Finally, data collected while surveying the premises and data generated while simulating the performance of the wireless network is not shared between the tools, which hampers ease of procuring and sharing information.

Therefore, in light of the foregoing discussion, there exists a need to overcome the aforementioned drawbacks associated with existing equipment and techniques for determining the strength of the radio signals within the premises.

SUMMARY

The present disclosure seeks to provide a method for determining an area in which an attenuation object is located in a space. The present disclosure also seeks to provide a system for determining an area in which an attenuation object is located in a space. An aim of the present disclosure is to provide a solution that overcomes at least partially the problems encountered in prior art.

In a first aspect, the present disclosure provides a method for determining an area in which an attenuation object is located in a space, wherein the space is divided to finite elements, the method comprising:
- providing a first transmitter to transmit radio signal with a first strength value, wherein the first transmitter is at a first location (x1, y1, z1);
- moving a measurement device along a first path and measuring a plurality of real signal strength values at interest-locations along the first path, wherein the plurality of real signal strength values are measured using the first strength value at the interest-locations;
- calculating a theoretical signal strength value, for each of the interest-locations of the first path, using a radio signal propagation model assuming a free propagation between the first location and the interest-locations;
- setting an attenuation value for each of the finite elements, along lines connecting the first location and the interest-locations, to value of
  - a free space attenuation value if a difference between the theoretical signal strength value and a real signal strength value corresponding to each of the finite elements is within a predetermined tolerance, and
  - a non-free space attenuation value if the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements; and
- using locations of the finite elements with the non-free space attenuation value to determine the area in which the attenuation object is located.

In a second aspect, the present disclosure provides a system for determining an area in which an attenuation object is located in a space, wherein the space is divided to finite elements the system comprising:
- a first transmitter operable to transmit radio signal with a first strength value, wherein the first transmitter is at a first location (x1, y1, z1);
- a measurement device communicably coupled to the first transmitter, wherein the measurement device is operable to measure a plurality of real signal strength values at interest-locations along a first path when the measurement device is moved along the first path, wherein the plurality of real signal strength values are measured using the first strength value at the interest-locations;
- a processor communicably coupled to the first transmitter and the measurement device, the processor being configured to:
  - calculate a theoretical signal strength value, for each of the interest-locations of the first path, using a radio signal propagation model assuming a free propagation between the first location and the interest-locations;
  - set an attenuation value for each of the finite elements, along lines connecting the first location and the interest-locations, to value of
    - a free space attenuation value if a difference between the theoretical signal strength value and a real signal strength value corresponding to each of the finite elements is within a predetermined tolerance, and a non-free space attenuation value if the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements, and use locations of finite elements with the non-free space attenuation value to determine the area in which the attenuation object is located.

Embodiments of the present disclosure substantially eliminate or at least partially address the aforementioned problems in the prior art, and facilitate a simple, fast, accurate, and improved techniques for determining the attenuation object.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
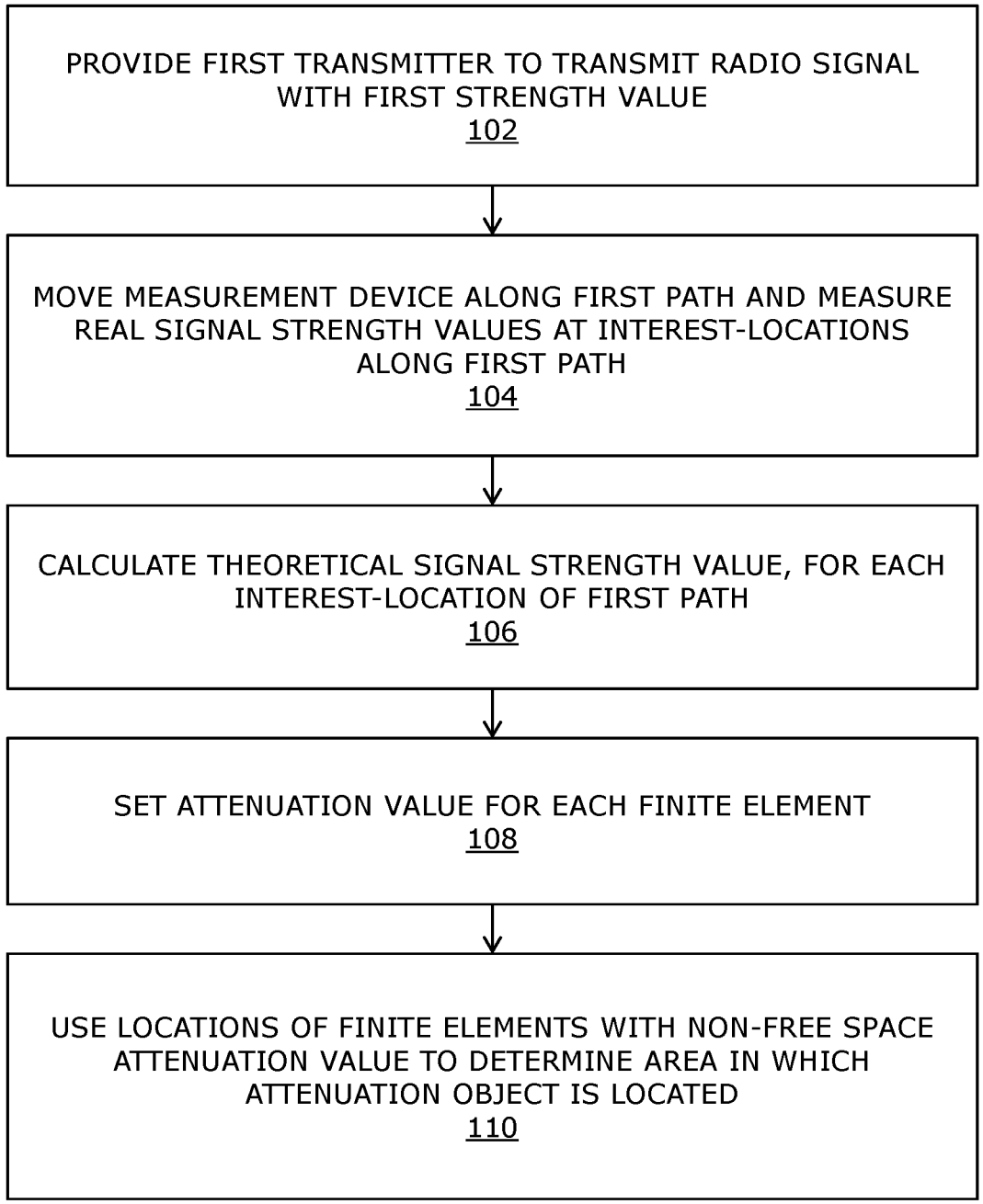
FIG. 1 shows an illustration of a flowchart depicting steps of method for determining an area in which an attenuation object is located in a space, wherein the space is divided to finite elements, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for determining an area in which an attenuation object is located in a space, wherein the space is divided to finite elements, the method comprising:

providing a first transmitter to transmit radio signal with a first strength value, wherein the first transmitter is at a first location (x1, y1, z1);

moving a measurement device along a first path and measuring a plurality of real signal strength values at interest-locations along the first path, wherein the plurality of real signal strength values are measured using the first strength value at the interest-locations;

calculating a theoretical signal strength value, for each of the interest-locations of the first path, using a radio signal propagation model assuming a free propagation between the first location and the interest-locations;

setting an attenuation value for each of the finite elements, along lines connecting the first location and the interest-locations, to value of a free space attenuation value if a difference between the theoretical signal strength value and a real signal strength value corresponding to each of the finite elements is within a predetermined tolerance, and a non-free space attenuation value if the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements; and using locations of the finite elements with the non-free space attenuation value to determine the area in which the attenuation object is located.

In a second aspect, the present disclosure provides a system for determining an area in which an attenuation object is located in a space, wherein the space is divided to finite elements the system comprising:

a first transmitter operable to transmit radio signal with a first strength value, wherein the first transmitter is at a first location (x1, y1, z1);

a measurement device communicably coupled to the first transmitter, wherein the measurement device is operable to measure a plurality of real signal strength values at interest-locations along a first path when the measurement device is moved along the first path, wherein the plurality of real signal strength values are measured using the first strength value at the interest-locations;

a processor communicably coupled to the first transmitter and the measurement device, the processor being configured to:

calculate a theoretical signal strength value, for each of the interest-locations of the first path, using a radio signal propagation model assuming a free propagation between the first location and the interest-locations;

set an attenuation value for each of the finite, along lines connecting the first location and the interest-locations, to value of a free space attenuation value if a difference between the theoretical signal strength value and a real signal strength value corresponding to each of the finite elements is within a predetermined tolerance, and a non-free space attenuation value if the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements, and use locations of finite elements with the non-free space attenuation value to determine the area in which the attenuation object is located.

The present disclosure provides the aforementioned method and the aforementioned system for facilitating a simple, fast, accurate, and improved technique for determining the area in which the attenuation object is located in space. In the present disclosure, the space is divided into finite elements which is beneficial in easily locating any device and/or attenuation object in the space. Furthermore, the plurality of real signal strength values and the theoretical signal strength value of the radio signal (transmitted by the first transmitter), and locations of the finite elements, is useful for determining an attenuation value of each of the finite elements. Additionally, such attenuation value is used to determine location of the area and consequently, location of the attenuation object in the area. Moreover, the method and system reduce costs involved in determining such an area, and is time-efficient and accurate in nature.

Throughout the present disclosure, the term "attenuation object" refers to an object present in the space which at least one of: absorbs, diffracts, reflects, the radio signal transmitted by the first transmitter at the first location (x1, y1, z1). Examples of the attenuation object may include, but are not limited to, walls, window, doors, furniture, devices, and similar. The attenuation object is present within the area. Every attenuation object in the space has a corresponding attenuation value, which affects a strength of the radio signal transmitted by the first transmitter.

Throughout the present disclosure, the term "space" refers to a physical location encompassing the area. Examples of space may include, but are not limited to, a utility room, a storage area, a meeting room, a hospital room, a school class room, and similar. The space may be within or outside a premises. Herein, the term "premises" refers to a house or a building, together with a portion of land and outbuildings surrounding said house or building. Examples of the premises may include, but are not limited to, a house (for example, such as a bungalow, a villa, an apartment, and the like), a housing complex (for example, a multi-storey structure having multiple apartments), a hotel, a hospital, an office premises, a commercial establishment (for example, such as a shop, a shopping mall, an office premises, and the like), an industrial building (for example, such as a workshop, factory).

It will be appreciated that the space is represented in a form of at least one floor plan. Herein, the at least one floor plan is a technical drawing drawn to scale, showing relationships between different spaces within the premises, and other physical features of the space. Examples of the physical features may include, but are not limited to, walls, floors, doors, objects, furniture. The at least one floor plan may be either drawn manually, automatically, or a combination of both. The at least one floor plan can be in a form of a JPG file, a GIF file, a PDF file, and similar.

Notably, the space is divided into finite elements, or specifically, the space is divided into squares, rectangles or hexagons of same dimension, by a network of horizontal and vertical lines superimposed on the at least one floor plan. Herein, each finite element corresponds to a square, a rectangle or a hexagon, wherein the square, the rectangle or the hexagon are labelled using three-dimensional (3D) Cartesian coordinate system. The 3D Cartesian coordinate system uses x-axis, y-axis, and z-axis to represent length, breadth and height of the space, and subsequently the attenuation objects present in the space. Such labelling of the finite elements enables precise location of any object (such as, for example, the attenuation object), or a device (such as, for example, the first transmitter) in the space. It will be appreciated that the first location (x1, y1, z1) of the first transmitter is known when at least one finite element is labelled, and such labelling corresponds to a position of the first transmitter in the space. As an example, an exemplary space may have following dimensions: a length of 10 metres (m), a breadth of 10 m, and a height of 10 m. This space may be divided to finite elements of following dimensions: a length of 1 m, a breadth of 1 m, and a height of 1 m.

The first transmitter is an electronic device that transmits radio signal for transmitting data to fulfil a specific communication purpose. Conventionally, devices that are used currently configured for communication have transmitters such as for example, but not limited to, Wi-Fi®, Bluetooth®, Near-field Communication (NFC®). Specifically, the first transmitter is implemented as a Radio Frequency (RF) transmitter used for communication over radio frequency, wherein a frequency band (commonly known as a channel) of the RF transmitter may range from ISM 2.4 gigahertz (GHz) to 7 GHZ. Herein, the "channel" corresponds to a range of frequencies, wherein a difference between a maximum value of frequency and a minimum value of frequency in the range of frequencies denotes the maximum theoretical information carrying capacity of the first transmitter.

Furthermore, the first transmitter transmits the radio signal with the first strength value, wherein the term "first strength value" refers to a power output of the first transmitter, in terms of a given unit of measurement, of the radio signal. The radio signal is transmitted through the number of channels. Herein, the given unit of measurement commonly used is milliwatt, but could also be decibel milliwatt, watt, and similar.

Throughout the present disclosure, the term "measurement device" refers to an electronic device that, in use, scans the space to collect information indicative of the plurality of real signal strength values at the interest-locations, in order to determine strength of the radio signal (which is transmitted by the first transmitter) received by the measurement device at the interest-locations along the first path. The measurement device is a hand-held device which is moved throughout the space to measure a given real signal strength value which denotes a strength of the radio signal transmitted by the first transmitter, at the given interest-location along the first path. Examples of the measurement device include, but are not limited to, a laptop, a tablet, a phablet, a smartphone, a smart device.

Throughout the present disclosure, the term "real signal strength value" refers to an actual strength of the radio signal received by the measurement device at the interest-locations. In other words, the plurality of real signal strength values, at the interest-locations, is cumulation of the first strength value. As an example, the plurality of real signal strength values, at the interest-locations is any one of: an average, of the first strength value, a cumulative maximum value of the first strength value, a median of the first strength value, and similar. Consequently, the plurality of real signal strength values is used to find a maximum number of finite elements with the non-free space attenuation value, thereby clearly defining the area. In one aspect, when there is free space propagation, i.e., absence of any attenuation object in a path through which the radio signals of the first transmitter is transmitted, the given real signal strength value gradually decreases as distance between the first transmitter and each of the interest-locations increases.) In another aspect, when the attenuation object is located between the first location (x1, y1, z1), the given real signal strength value in an immediate vicinity and at a location of the attenuation object decreases abruptly from the first strength value transmitted by the transmitter. It will be appreciated that the term "interest-locations" refers to locations within the space where the measurement device measures the plurality of real signal strength values, wherein the interest-locations lie on the first path.

Optionally, the measurement device is a signal strength meter comprising, an antenna, a display, input-output controls, and a power source. Herein, the signal strength meter is a device that indicates the plurality of real signal strength values received by the measurement device at the interest-locations. The antenna of the measurement device intercepts the radio signal transmitted by the first transmitter, and converts the radio signal into alternating current which is then applied to the input-output control, to collect the information. The antenna is designed in such a way, so as to support frequency bands ranging from 2.4 GHz to 7 GHz of the first transmitter. The input-output controls are used to procure input from any user associated with the measurement device, and provide an output.

Optionally, at least the plurality of real signal strength values are displayed on the display of the measurement device. Herein the display is any of an analogue display or a digital display. Herein, the display displays a visual representation of the plurality of real signal strength values in a form of a graph, a text, a table, and similar. Optionally, the power source provides electrical power required by the measurement device. Examples of power source can be, a power bank, a cell, an adaptor, and similar.

Throughout the present disclosure, the term "theoretical signal strength value" is a calculated value of the radio signal transmitted by the first transmitter, assuming a free space path (i.e., a path with no attenuation objects). The theoretical signal strength value is expressed in terms of the given unit of measurement, which is similar to the first strength value. The theoretical signal strength value is calculated using the radio signal propagation model. The radio signal propagation model is used to determine a behaviour of the radio signal when transmitted from the first transmitter and received by the measurement device at the interest-locations along the first path. Furthermore, the radio signal propagation model determines a relation between the distance of the first transmitter at the first location (x1, y1, z1) and the measurement device at the interest-locations along the first path, and a loss in the first strength value of the radio signal transmitted from the first transmitter while propagating along the distance. While calculating the theoretical signal strength value at the interest-locations, free space propagation (i.e., ideal propagation) is assumed which is used to model the loss in the first strength value of the radio signal incurred in a free space environment. Herein, the term "free space" refers to the space unoccupied by any attenuation object, and only has the radio signal apart transmitted by the first transmitter. Examples of the radio signal propagation model may include, but are not limited to, free space propagation model, Longley-Rice propagation model, the Okumura-Hata propagation model. Such radio signal propagation model are well known in the art. For example, according to an exemplary radio signal propagation model, with every 1 metre distance away from the first transmitter, the first strength value of the radio signal transmitted from the first transmitter reduces by 10 percent.

Throughout the present disclosure, the term "attenuation value" refers to a value representing the loss of the first strength value of the radio signal incurred while transmitting the radio signal from the first transmitter to the measurement device at the interest-locations. The attenuation value is used to determine the first strength of the radio signal as a function of distance between the first location (x1, y1, z1) and the interest-locations along the first path. In this regard, the free space attenuation value is set for each of the finite element when the difference between the theoretical signal strength value and a real signal strength value corresponding to each of the finite elements is within a predetermined tolerance. As a first example, the predetermined tolerance may lie in a range from 0 decibel (dB) up to 1 dB. Herein, when the difference between the theoretical signal strength value and the real signal strength value is 0.5 dB, the attenuation value for a given finite element will be set to the free space attenuation value.

Alternatively, when the difference between the theoretical signal strength value and the real signal strength value is outside the predetermined tolerance, the non-free space attenuation value is set for the finite element from amongst the finite elements. Herein, the non-free space attenuation value denotes that the radio signal transmitted by the first transmitter incurs a loss in the first strength value after propagating across the finite element, while approaching the interest-locations. Herein, the free space attenuation value of the radio signal (determined using the radio signal propagation model) is used to calculate the non-free space attenuation value, along with the difference between the theoretical signal strength value and the real signal strength value corresponding to each of the finite elements, wherein the difference between the theoretical signal strength value and the real signal strength value is incremental in nature. Continuing with reference to the first example, when the difference between the theoretical signal strength value and the real signal strength value is 2 dB, the attenuation value for a given finite element will be set to the non-free space attenuation value.

The locations of the finite elements are already available, as described earlier. For each of the finite elements, based on the difference between the theoretical signal strength value and the real signal strength value with respect to the predetermined tolerance, the free space attenuation value and the non-free space attenuation value for each of the finite element is set. Subsequently, only those finite elements having the non-free space attenuation value are considered for determining the area in which the attenuation object is located. The non-free space attenuation value of the finite elements depends on at least one of: a distance between the first location (x1, y1, z1) and the interest-locations along the first path, a type of construction material of the attenuation object, a thickness of the attenuation object, and similar.

In a second example, a first transmitter T1 may be provided in an exemplary space, wherein the exemplary space is divided to finite elements F1 and F2. The first transmitter T1 may transmit a radio signal with first strength value of 500 milliwatts (mW), wherein the first transmitter T1 may be at a first location O. The measurement device may be moved along a first path to measure a plurality of real signal strength values at interest-locations A and B along the first path. The plurality of values at the interest-locations A-B may be measured to be 400 mW and 200 mW, respectively. A theoretical signal strength value of 408 mW and 250 mW may be calculated at the interest-locations A-B, respectively, assuming a free propagation between the first location O and the interest-locations A-B. Herein, the finite elements F1-F2 may lie along lines X and Y, respectively, wherein the lines X-Y may connect the first location O and the interest-locations A-B, respectively. Subsequently, an attenuation value is set for each of the finite elements F1-F2. Herein, an exemplary predetermined tolerance may lie in a range from 0 mW up to 10 mW. For the finite element F1 lying along the line X, the attenuation value set may be a free space attenuation value, as a difference between the theoretical signal strength value and the real signal strength value may lie within the predetermined tolerance. i.e., 408 mW−400 mW=8 mW. Herein, the free space attenuation value of the finite element F1 lying along the line X may be −5 dB. Similarly, for the finite element F2 lying along the line Y, a non-free space attenuation value may be set, as a difference between the theoretical signal strength value and the real signal strength value may lie outside the predetermined tolerance. i.e., 250 mW-200 mW=50 mW. Herein, the non-free space attenuation value of the finite element F2 lying along the line Y may be −90 dB, which is a free space attenuation value (wherein the free space attenuation values may increase with respect to a square of distance between the finite element and the first transmitter at the first location O), and the difference between the theoretical signal strength value and the real signal strength value corresponding to the finite element F2. Consequently, location of the finite element F2 with the non-free space attenuation value may be used to determine the area in which the attenuation object is located.

Optionally, the finite elements with the non-free space attenuation value defines a periphery of the area or a core of the area. The finite elements with the non-free space attenuation value are present in a boundary of the area, in particular the periphery of the area. Alternatively, when the finite elements with the non-free space attenuation value are such that a core (in other words, a central portion) of the area is determined.

Optionally, the method further comprises providing at least one second transmitter, in addition to the first transmitter, to transmit radio signals with the first strength value, wherein the at least one second transmitter is positioned at a location within the space and away from the first location (x1, y1, z1). The at least one second transmitter functions in a manner similar to the first transmitter. Herein, the location of the at least one second transmitter is identified using the finite elements superimposed on the at least one floor plan. It will be appreciated that the first transmitter and the at least one second transmitter transmit radio signals of the first signal strength value to communicate via a communication protocol (such as, for example, Inter-Access Point Protocol). In this regard, a number of transmitters available for transmitting radio signal with the first strength value increases. It will be appreciated that a number of channels available throughout the space remains the same. However, as a number of transmitters increase, the radio signals transmitted via the channels of the first transmitter and the at least one second transmitter increases. Alternatively, the first transmitter and the at least one second transmitter can transmit respective radio signals of different signal strength values to communicate via different communication protocols. A technical benefit is to increase a number of measurements to precisely represent the space to provide an accurate representation of the strength of the radio signal available within that space, and to accurately define the area within the space.

Optionally, each of the first transmitter and the at least one second transmitter is a wireless access point. Herein, the wireless access point is connected directly to a wired local area network (LAN) (such as, for example, Ethernet) to provide wireless connections to wireless devices in the space. In one aspect, the wireless access point is connected to a router in a wired manner. In another aspect, the wireless access point is connected to the router in a wireless manner. In yet another aspect, the wireless access point is an integral component of the router itself. The wireless access point can be fixed, mobile, or a combination of both in the space. The radio signals are transmitted from the first transmitter and/or the second transmitter via the channels available for transmission of said radio signals, as not all channels are available for transmission at all times.

Optionally, the method comprises associating the first strength value of the radio signal transmitted by the first transmitter with a measure of beacon frames corresponding to a plurality of channels of the wireless access point. The term "beacon frames" is a management frame which comprises information about the wireless access points. This information comprises at least one of: a service set identifier (SSID), a strength of the radio signal transmitted by the first transmitter, channel information, supported data rates, and similar. Such beacon frames are transmitted from the wireless access point at a given time interval via the plurality of channels. A number of the plurality of channels depends on a frequency at which the first transmitter operates on, wherein the frequency may be 2.4 GHZ, 5 GHZ, or 6 GHz. The frequency is divided into frequency bands with the maximum value of frequency and the minimum value of frequency, as described earlier, wherein each of the frequency bands corresponds to a channel from amongst the plurality of channels. Furthermore, the given time interval can be 100 milliseconds (ms). Specifically, the given time interval is 102.4 ms. For example, when the first transmitter is transmitting radio signals at a frequency of 2.4 GHZ. The 2.4 GHz is divided into 14 channels, through which beacon frames are sent at the given time interval of 100 ms.

Optionally, the given time interval can be changed based on the first strength value of the radio signal. In other words, when the first strength value of the radio signal is high, the beacon frames are transmitted through the plurality of channels by reducing the given time interval. Alternatively, when the first strength value of the radio signal is weak, the beacon frames are transmitted through the plurality of channels by increasing the given time interval.

Optionally, the method further comprises moving the measurement device along a second path and measuring a plurality of real signal strength values at interest-locations along the second path. Herein, the second path is different from the first path, hence the interest-locations along the second path is different from the interest-locations along the first path. While moving the measurement device along the second path, the radio signals from the first transmitter and/or the at least one second transmitter is measured, to validate the plurality of real signal strength values measured when the measurement device was moved along the first path. A technical benefit of validating the plurality of real signal strength values, is to improve accuracy and completeness of the plurality of real signal strength values collected during the measurement of the first strength of the radio signals. Ideally, the plurality of real signal strength values measured by the measurement device at the interest-locations along the second path should match the plurality of real signal strength values obtained along at the interest-locations along the first path, which improves the accuracy of measurement, when the interest-locations along the second path coincide with the interest-locations along the first path. The plurality of real signal strength values while moving the measurement device along the second path is measured in a manner similar to the measurement of the plurality of real signal strength values while moving the measurement device along the first path.

Optionally, the radio signal propagation model is used to calculate another theoretical signal strength value, for each of the interest-locations of the second path, in a manner similar to the calculation of the theoretical signal strength value, for each of the interest-locations of the first path. Then, attenuation value for each of the finite elements, along lines connecting the location of the at least one second transmitter and the interest-locations along with second path are set, in a manner similar to the setting of the attenuation value for each of the finite elements, along the lines connecting the first location and the interest-locations along the first path. Hence, the non-free space attenuation values set for the finite elements is measured accurately by the measurement device when at least the first transmitter and/or the at least one second transmitter transmits the radio signal with the first strength value.

Continuing in reference to the second example, two second transmitters T2 and T3, may be provided in the exemplary space, in addition to the first transmitter T1. The two second transmitters T2-3 may transmit radio signals with the first strength value of 500 milliwatts (mW). The two second transmitters T2-3 may be positioned at a location within the space and away from the first location O. The measurement device may be moved along a second path to measure a plurality of real signal strength values at interest-locations C and D along the second path, which may be 420 mW and 470 mW. respectively. The theoretical signal strength value, for each of the interest-locations C-D may be calculated, assuming free propagation between the locations of the two second transmitters T2-3 and the interest-locations C-D. Herein, the theoretical signal strength value, for each of the interest-locations C-D may be calculated to be 460 mW and 480 mW, respectively. The attenuation values of the finite elements may be set in a manner similar to the manner described earlier. Consequently, the locations of the finite elements F1-2 with the non-free space attenuation values may be used to determine the area in which the attenuation object is located.

Optionally, associating the plurality of real signal strength values, measured by the measurement device, with measure of signal strength corresponding to interacting channels of the wireless access point. The measurement device is moved either along the first path or the second path. The measurement device scans the plurality of channels of the wireless access point. Herein, the term "interacting channel" refers to a channel that transmits beacon frames to denote existence and availability of the wireless access point. The measurement device while measuring the plurality of real signal strength values, receives the beacon frames (which is transmitted from the wireless access point in the given time interval). Subsequently, the beacon frames are stored and associated with the location in the space where the plurality of real signal strength values from the first transmitter and/or the at least one second transmitter was received. The attenuation value set for the finite element corresponds to the measure of the signal strength which further corresponds to the interacting channels of the wireless access point.

Optionally, the method comprises measuring the plurality of real signal strength values, by:
  scanning all channels of the wireless access point in a first round; and
  scanning only interacting channels amongst all channels in subsequent rounds after the first round.

Herein, the term "first round" refers to a first scan cycle of the measurement device, wherein the first scan cycle scans the radio signals transmitted by the first transmitter and/or the at least one second transmitter, to measure the plurality of real signal strength values. In this regard, in the first round, the measurement device parallelly scans several channels from amongst all channels using several antennas, simultaneously, to receive beacon frames from said channels. Subsequently, only the interacting channels (which transmits beacon frames to the antenna of the measurement device), are selected from the first round. In other words, the measurement device considers only the interacting channels, and skips those channels from amongst all the channels that do not interact (in other words, a non-interacting channel). After subsequent rounds, in case the non-interacting channel starts interacting, said non-interacting channel is considered to be one of the interacting channels, and the measurement device scans such channel to receive the beacon frame. Beneficially, the measurement of the plurality of real signal strength values increase as the measurement device measures only the interacting channels, and therefore consumes less power, produces more measurements that increase accuracy, and saves time.

In a third example, the measurement device comprises two antennas A and B. The wireless access point has 20 channels available. The antenna A scans channels 1-10, and simultaneously the antenna B scans channels 11-20. The given time interval of receiving the beacon frame by the measurement device may be 102.5 ms. Hence, the first round of scanning all of the 20 channels is completed in approximately 1 second (i.e., 10*102.5 ms). In case in the first round, the measurement device did not receive a beacon frame from channel 6, then in the subsequent rounds, channel 6 is skipped. The channel 6 is reconsidered after the subsequent rounds.

Optionally, the method further comprises using the non-free space attenuation value to identify an attenuation value of the attenuation object located in the area. Herein, when the area on which a set of finite elements from amongst the finite elements has a same or a similar non-free space attenuation value, it indicates a presence of the attenuation object in the area. Due to the labelling of the finite elements, the location of the attenuation object is easily identified.

Continuing in reference to the second example, the non-free space attenuation value that may be set for the finite element F2 that may indicate a presence and the location of the attenuation object in the area.

Optionally, the method further comprises using the free space attenuation value to identify locations of the first transmitter and the at least one second transmitter. The free space attenuation value is a function of the distance between the first transmitter and the at least one second transmitter, with the measurement device moving along any of the first path or the second path. The free space attenuation value is strongest in an immediate vicinity of the first transmitter and the at least one second transmitter, and gradually weakens as the radio signal propagates away from the first transmitter and/or the at least one second transmitter, towards the interest-locations. Upon backtracking the strength of the radio signals from the interest-locations, and when reaching a location where the strength of the radio signal remains consistently high (i.e., locations of the finite elements having the free-space attenuation value), the locations of the first transmitter and the at least one second transmitter are identified.

Continuing in reference to the second example, the free-space attenuation value that may be set for the finite element F1 may be used to identify location of the first transmitter T1, as strength of the radio signal transmitted by the first transmitter T1 from the first location O may gradually weaken (as a square of distance) as the radio signal may reach the finite element F1.

Optionally, the method further comprises using the free and the non-free space attenuation values associated with the finite elements to generate at least a two-dimensional (2D) map or a three-dimensional (3D) simulation model, wherein the 2D map or the 3D simulation model are indicative of the attenuation objects with attenuation values and locations of the first transmitter and the at least one second transmitter in the space. The 2D map provides a 2D view of the space along with the attenuation values of the finite elements superimposed on the space, and location of the first transmitter (and, optionally, the location of the at least one second transmitter) in the space. Based on the attenuation values of the finite elements, the 2D map is generated as a heat map, which is overlaid on top of the at least one floor plan. Herein, in the heat map, the attenuation values of the finite elements are mapped to colours, for example, a free-space attenuation value is mapped to green colour, a non-free space attenuation value is mapped to red colour, and similar.

In other words, the interacting channels which are scanned to receive beacon frames in the first round and the subsequent rounds is used to generate at least the 2D map or the 3D simulation model of the space, wherein the measure of the beacon frames is associated with the first strength value of the radio signal transmitted by the first transmitter.

Optionally, the method further comprises using at least the 2D map or the 3D simulation model of the space, with an altered number of transmitters or an altered location of the transmitters, to have a maximum number of finite elements lying within a predefined range of attenuation values. Herein, the number of the transmitters can be altered (i.e., added or removed) from the space either digitally on the 2D map or the 3D simulation model, or physically from the space. Subsequently, a change in the strength of the radio signals transmitted by the transmitters is visualised in real time or in near-real time on the 2D map or the 3D simulation model of the space. Similarly, the locations of the first transmitter and the at least one second transmitter can be altered (i.e., repositioned within the space) digitally in the 2D map or the 3D simulation model, or physically in the space. In other words, while altering the number of transmitters, or the location of the transmitters, the measure of the signal strength corresponding to the interacting channels is altered. Herein, the phrase "maximum number of finite elements" refers to a highest possible number of finite elements having an attenuation value lying within the predefined range of attenuation values. It will be appreciated that, the attenuation value of the attenuation object is constant, thereby the attenuation value of the finite elements in which the attenuation object is located will also remain constant. Herein, the predefined range of attenuation values encompasses those attenuation values which are low in value. As an example, the predefined range of attenuation values may lie in a range from −20 dB up to −70 dB. The predefined range of attenuation values may in a range from −20, −25, −35, −45, or −60 dB up to −30, −50, −65, or −70 dB. In this regard, when the attenuation value of a given finite element is low, the signal strength in said given finite element improves. The lowering of the attenuation value of the finite elements is achieved by altering the number of the transmitters or location of the transmitters so that the highest possible number of finite elements (except the finite elements in which the attenuation object is located), has an improved signal strength.

Consequently, this enables visualising a change in the strength of the radio signals transmitted by the first transmitter and the at least one second transmitter in the 2D map or the 3D simulation model in real-time. in real time or in near-real time in the 2D map or the 3D simulation model of the space. In other words, strength of the radio signal is strong throughout the space.

The present disclosure also relates to the system as described above. Various embodiments and variants disclosed above, with respect to the aforementioned system, apply mutatis mutandis to the system.

Optionally, the system further comprises at least one second transmitter, in addition to the first transmitter, to transmit radio signals with the first strength value, wherein the at least one second transmitter is positioned at a location within the space and away from the first location (x1, y1, z1).

Optionally, each of the first transmitter and the at least one second transmitter is a wireless access point.

Optionally, the measurement device is a signal strength meter comprising, in addition to the processor, an antenna, a display, input-output controls, and a power source.

The term "processor" relates to a computational element that is operable to respond to and processes instructions that drive the measurement device. Furthermore, the term "processor" may refer to one or more individual processors, processing devices and various elements associated with a processing device that may be shared by other processing devices. Such processors, processing devices and elements may be arranged in various architectures for responding to and executing the steps of the measurement device. In some implementations, the processor is implemented as a remote server. In such implementations, the remote server is separately located from the measurement device. Moreover, the remote processor receives the plurality of real signal strength values and the theoretical signal strength value from the measurement device, or from a data repository, to calculate the attenuation values of the finite elements. As an example, the remote server could be a cloud server that provides a cloud computing service. In other implementations, the processor is implemented as a processor of the measurement device.

Optionally, the first strength value of the radio signal transmitted by the first transmitter is associated with a measure of beacon frames corresponding to a plurality of channels of the wireless access point.

Optionally, the plurality of real signal strength values, measured by the measurement device, is associated with measure of signal strength corresponding to interacting channels of the wireless access point.

Optionally, the processor, measures the plurality of real signal strength values, by:
scanning all channels of the wireless access point in a first round; and
scanning only interacting channels amongst all channels in subsequent rounds after the first round.

DETAILED DESCRIPTION OF THE DRAWINGS

Referring to FIG. 1, there is shown an illustration of a flowchart depicting steps of method for determining an area in which an attenuation object is located in a space, wherein the space is divided to finite elements, in accordance with an embodiment of the present disclosure. At step 102, a first transmitter is provided to transmit radio signal with a first strength value, wherein the first transmitter is at a first location (x1, y1, z1). At step 104, a measurement device is moved along a first path and measures a plurality of real signal strength values at interest-locations along the first path. Herein, the plurality of real signal strength values are measured using the first strength value at the interest-locations. At step 106, a theoretical signal strength value is calculated, for each of the interest-locations of the first path, using a radio signal propagation model assuming a free propagation between the first location and the interest-locations. At step 108, setting an attenuation value for each of the finite elements, along lines connecting the first location and the interest-locations. The attenuation value is set to value of a free space attenuation value if a difference between the theoretical signal strength value and a real signal strength value corresponding to each of the finite elements is within a predetermined tolerance, and a non-free space attenuation value if the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements. At step 110, locations of the finite elements are used with the non-free space attenuation value to determine the area in which the attenuation object is located.

The aforementioned steps are only illustrative and other alternatives can also be provided where one or more steps are added, one or more steps are removed, or one or more steps are provided in a different sequence without departing from the scope of the claims herein.

Figure 2A:
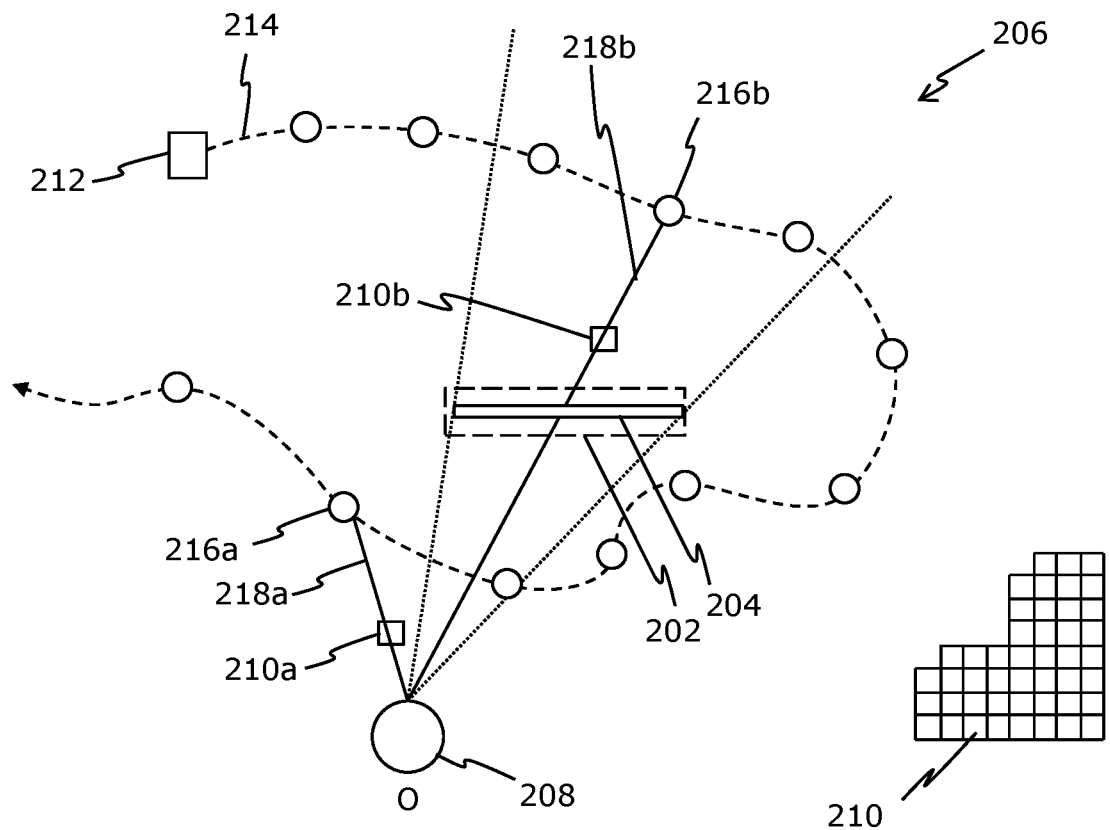
FIGS. 2A and 2B show exemplary illustrations of determining an area in which an attenuation object is located in a space, in accordance with different embodiments of the present disclosure.
Figure 2B:
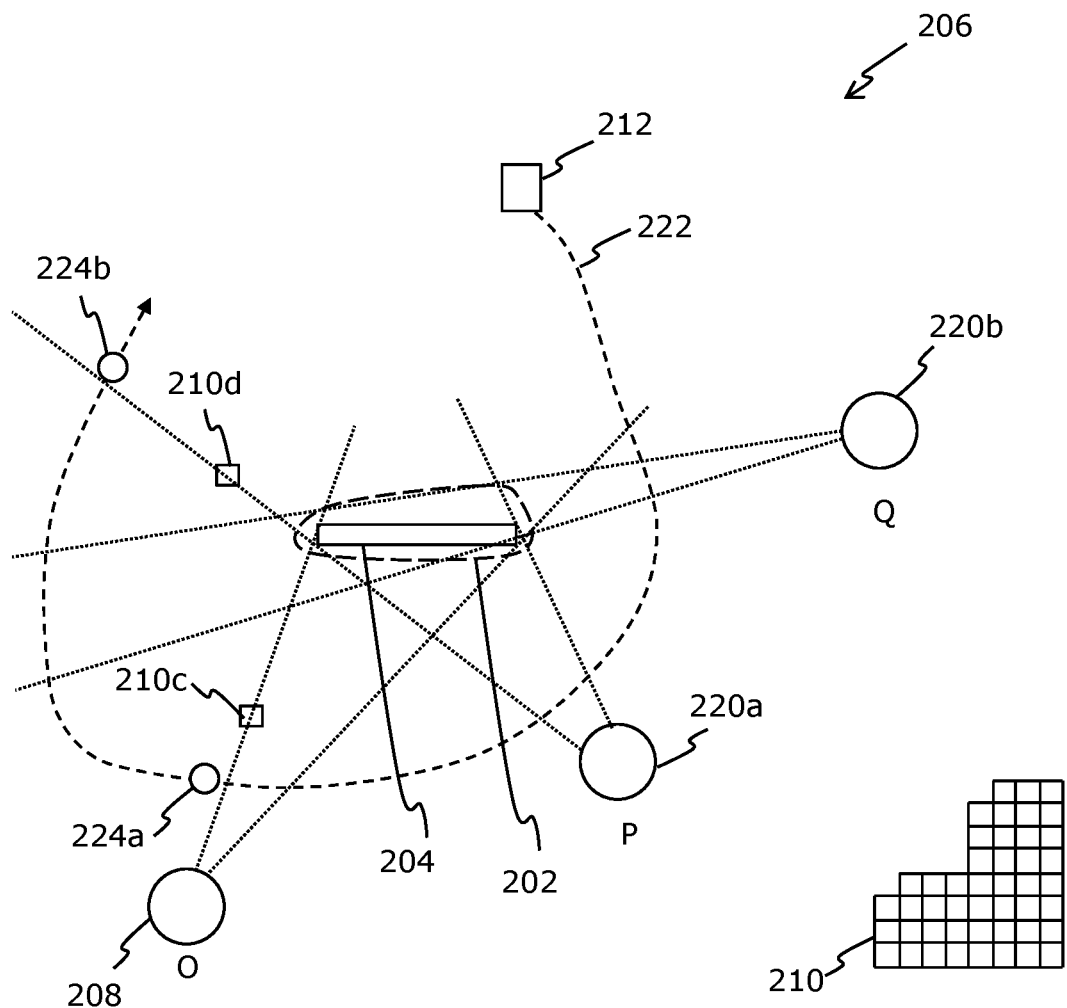

Referring to FIGS. 2A and 2B, there are shown exemplary illustrations of determining an area (as depicted by a dashed polygon 202) in which an attenuation object 204 is located in a space 206, in accordance with an embodiment of the present disclosure. A first transmitter 208 is provided in the space 206. The first transmitter 208 transmits radio signal with a first strength value of 500 milliwatts (mW), wherein the first transmitter 208 is at a first location O. In FIG. 2A, I space 206 is divided to finite elements (depicted by finite elements 210, 210a, 210b). IA measurement device 212 is moved along a first path 214 to measure a plurality of signal strength values at interest-locations (depicted by interest-locations 216a, 216b) along the first path 214.

The plurality of real signal strength values at the interest-locations 216a-b are measured to be 400 mW and 200 mW, respectively. Simultaneously or subsequently, a theoretical signal strength value 408 mW and 250 mW is calculated at the interest locations 216a-b, respectively, assuming a free propagation between the first location O and the interest-locations 216a-b. Herein, the finite elements 208a-b lie along lines (depicted by lines 218a, 218b), respectively, wherein the lines 218a-b connect the first location O and the interest locations 216a-b, respectively. Subsequently, an attenuation value is set for each of the finite elements 208a-b. Herein, a predetermined tolerance may lie in a range from 0 mW up to 10 mW. For the finite element 208a lying along the line 218a, the attenuation value is set to a value of a free space attenuation value, as a difference between the theoretical signal strength value and a real signal strength value lies within a predetermined tolerance, i.e., 408 mW-400 mW=8 mW. Herein, the free space attenuation value of the finite element 208a lying along the line 218a may be −5 dB.

Similarly, for the finite element 208b lying along the line 218b, a non-free space attenuation value is set, as a difference between the theoretical signal strength value and the real signal strength value lies outside the predetermined tolerance i.e., 250 mW−200 mW=50 mW. Herein, the non-free space attenuation value of the finite element 208b lying along the line 218b may be −90 dB, which is a free space attenuation value (wherein the free space attenuation values may increase with respect to a square of distance between the finite element 208b and the first transmitter at the first location O) and the difference between the theoretical signal strength value and the real signal strength value corresponding to the finite element 208b.

In FIG. 2B, at least one second transmitter (depicted by two second transmitters 220a, 220b) is provided in the space 206, in addition to the first transmitter 208. The space 206 is divided to finite elements (as depicted by 210c, 210d). The two second transmitters 220a-b transmit radio signals with the first strength value of 500 mW. The two second transmitters 220a-b are positioned at locations P and point Q within the space 206, respectively, wherein the points P-Q are away from the first location O. The measurement device 212 moves along a second path 222 to measure a plurality of real signal strength values at interest-locations (depicted as interest-locations 224a, 224b) along the second path 222, which is 420 mW And 470 mW. respectively. A theoretical signal strength value, for each of the interest-locations 224a-b may be calculated, assuming free propagation between the locations P-Q of the two second transmitters 220a-b and the interest-locations 224a-b. Herein, the theoretical signal strength value, for each of the interest-locations 224a-b is calculated to be 460 mW and 480 mW, respectively. The attenuation values of the finite elements 210c-d is set in a manner similar to the manner as described in FIG. 2A hereinabove. Consequently, the locations P-Q of the finite elements 210c-d with the non-free space attenuation values is used to determine the area in which the attenuation object is located.

FIGS. 2A and 2B are merely examples and can have different first paths, different second paths, number of transmitters, number of finite elements, attenuation objects, which should not unduly limit the scope of the claims herein. A person skilled in the art will recognize many variations, alternatives, and modifications of embodiments of the present disclosure.

Figure 3A:
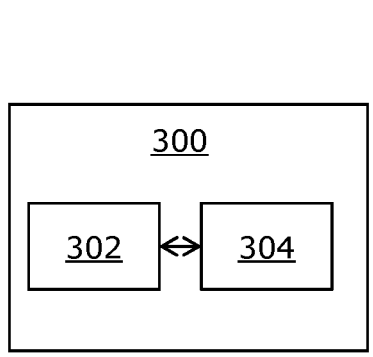
FIGS. 3A and 3B, show block diagrams of a system determining an area in which an attenuation object is located in a space, wherein the space is divided to finite elements, in accordance with an embodiment of the present disclosure.
Figure 3B:
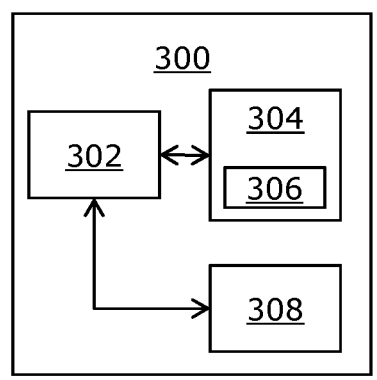

Referring to FIGS. 3A and 3B, there are shown block diagrams of a system 300 determining an area in which an attenuation object is located in a space, wherein the space is divided to finite elements, in accordance with an embodiment of the present disclosure. In FIG. 3A, the system 300 comprises a first transmitter 302 and a measurement device 304. The measurement device 304 comprises a processor

306. In FIG. 3B, the system 300 further comprises at least one second transmitter (depicted as a second transmitter 308).

Modifications to embodiments of the present disclosure described in the foregoing are possible without departing from the scope of the present disclosure as defined by the accompanying claims. Expressions such as "including", "comprising", "incorporating", "have", "is" are used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for determining an area in which an attenuation object is located in a space, wherein the space is divided to finite elements, the method comprising:
   providing a first transmitter to transmit radio signal with a first strength value, wherein the first transmitter is at a first location;
   moving a measurement device along a first path and measuring a plurality of real signal strength values at interest-locations along the first path, wherein the plurality of real signal strength values are measured using the first strength value at the interest-locations;
   calculating a theoretical signal strength value, for each of the interest-locations of the first path, using a radio signal propagation model assuming a free propagation between the first location and the interest-locations;
   setting an attenuation value for each of the finite elements, along lines connecting the first location and the interest-locations, to value of
      a free space attenuation value when a difference between the theoretical signal strength value and a real signal strength value corresponding to each of the finite elements is within a predetermined tolerance, and
      a non-free space attenuation value when the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements; and
   using locations of the finite elements with the non-free space attenuation value to determine the area in which the attenuation object is located.

2. The method according to claim 1, further comprising providing at least one second transmitter, in addition to the first transmitter, to transmit radio signals with the first strength value, wherein the at least one second transmitter is positioned at a location within the space and away from the first location.

3. The method according to claim 2, further comprising using the free space attenuation value to identify locations of the first transmitter and the at least one second transmitter.

4. The method according to claim 1, further comprising moving the measurement device along a second path and measuring a plurality of real signal strength values at interest-locations along the second path.

5. The method according to claim 1, wherein the finite elements with the non-free space attenuation value defines at least a periphery of the area or a core of the area.

6. The method according to claim 1, further comprising using the non-free space attenuation value to identify an attenuation value of the attenuation object located in the area.

7. The method according to claim 6, further comprising using the free and the non-free space attenuation values associated with the finite elements to generate at least a two-dimensional (2D) map or a three-dimensional (3D) simulation model of the space, wherein the 2D map or the 3D simulation model are indicative of the attenuation objects with attenuation values and locations of the first transmitter and the at least one second transmitter in the space.

8. The method according to claim 7, further comprising using the 2D map or the 3D simulation model of the space, for altering at least a number of the first transmitter and the at least one second transmitter or location of the first transmitter and the at least one second transmitter, to have a maximum number of finite elements lying within a predefined range of attenuation values.

9. A system for determining an area in which an attenuation object is located in a space, wherein the space is divided to finite elements the system comprising:
   a first transmitter configured to transmit radio signal with a first strength value, wherein the first transmitter is at a first location;
   a measurement device communicably coupled to the first transmitter,
   a processor communicably coupled to the first transmitter and the measurement device, the processor being configured to:
   calculate a theoretical signal strength value, for each of the interest-locations of the first path, using a radio signal propagation model assuming a free propagation between the first location and the interest-locations,
   set an attenuation value for each of the finite, along lines connecting the first location and the interest-locations, to value of
      a free space attenuation value when a difference between the theoretical signal strength value and a real signal strength value corresponding to each of the finite elements is within a predetermined tolerance, and
      a non-free space attenuation value when the difference between the theoretical signal strength value and the real signal strength value is outside the predetermined tolerance, wherein the non-free space attenuation value is the free space attenuation value added with the difference between the theoretical signal strength value and the real signal strength value corresponding to each of the finite elements, and
   use locations of finite elements with the non-free space attenuation value to determine the area in which the attenuation object is located.

10. The system according to claim 9, further comprising at least one second transmitter, in addition to the first transmitter, to transmit radio signals with the first strength value, wherein the at least one second transmitter is positioned at a location within the space and away from the first location.

11. The system according to claim 10, wherein each of the first transmitter and the at least one second transmitter is a wireless access point.

12. The system according to claim 10, wherein the measurement device is a signal strength meter comprising, in addition to the processor, an antenna, a display, input-output controls, and a power source.

13. The system according to claim 10, wherein the first strength value of the radio signal transmitted by the first transmitter is associated with a measure of beacon frames corresponding to a plurality of channels of the wireless access point.

14. The system according to claim 13, wherein the plurality of real signal strength values, measured by the measurement device, is associated with measure of signal strength corresponding to interacting channels of the wireless access point.

15. The system according to claim 14, wherein the processor, measures the plurality of real signal strength values, by:
- scanning all channels of the wireless access point in a first round; and
- scanning only interacting channels amongst all channels in subsequent rounds after the first round.

* * * * *